US008367249B2

(12) United States Patent (10) Patent No.: US 8,367,249 B2
Gorshkov (45) Date of Patent: Feb. 5, 2013

(54) ANODE MATERIAL FOR LITHIUM-ION CHEMICAL POWER SOURCES AND METHOD OF OBTAINING THEREOF

(75) Inventor: Vadim S. Gorshkov, Ekaterinburg (RU)

(73) Assignee: Eliont LLC, Ekaterinburg (RU)

( * ) Notice: Subject to any disclaimer, the term of this patent is extended or adjusted under 35 U.S.C. 154(b) by 129 days.

(21) Appl. No.: 12/715,553

(22) Filed: Mar. 2, 2010

(65) Prior Publication Data

US 2010/0224824 A1 Sep. 9, 2010

(30) Foreign Application Priority Data

Mar. 6, 2009 (RU) ................................ 2009107944

(51) Int. Cl.
*H01M 4/58* (2010.01)
(52) U.S. Cl. ................... 429/231.5; 429/209; 429/218.1
(58) Field of Classification Search ................ 429/231.5
See application file for complete search history.

(56) References Cited

U.S. PATENT DOCUMENTS

| 6,379,843 | B1 | 4/2002 | Yamasaki | |
|---|---|---|---|---|
| 6,881,393 | B2 | 4/2005 | Spitler | |
| 7,211,350 | B2 | 5/2007 | Amatucci | |
| 7,368,097 | B2 | 5/2008 | Sterzel | |
| 7,541,016 | B2 | 6/2009 | Gorshkov | |
| 7,858,234 | B2 * | 12/2010 | Morishima et al. | ........... 429/226 |
| 2007/0238023 | A1 | 10/2007 | Gorshkov | |
| 2007/0243467 | A1 | 10/2007 | Zaghib | |
| 2008/0315161 | A1 | 12/2008 | Endo | |
| 2009/0004563 | A1 | 1/2009 | Zhong | |
| 2009/0315001 | A1 * | 12/2009 | Campet et al. | ........... 252/519.12 |

FOREIGN PATENT DOCUMENTS

| EP | 0845825 B1 | 1/2004 |
|---|---|---|
| RU | 2304325 | 8/2007 |
| RU | 2005136217 A | 8/2007 |
| WO | WO 97/48141 A1 | 12/1997 |
| WO | 2004114439 A1 | 12/2004 |

OTHER PUBLICATIONS

D.W. Murphy, R.J. Cava, S.M. Zahurak, and A. Santoro Ternary Lix TiO2 Phases from Insertion Reactions Solid State Ionics 9 & 10 pp. 413-417, 1983 North-Holland Publishing Company.
Shahua Huang, Zhaoyin Wen, Bin Lin, Jinduo Han, and Xiaognag Xu The high-rate performance of the newly designed Li4Ti5O12/Cu composite anode for lithium ion batteries ScienceDirect Journal of Alloys and Compounds Feb. 24, 2007, pp. 400-403, vol. 457.
Shahua Huang, Zhaoyin Wen, Xiujian Zhu, and Zuxiang Lin Effects of dopant on the electrochemical performance of Li4Ti5O12 as electrode material for lithium ion batteries ScienceDirect Journal of Power Sources Dec. 11, 2005, pp. 408-412, vol. 165.
Shahua Huang, Zhaoyin Wen, Jingchao Zhang, and Xuelin Yang Improving the electrochemical performance of Li4Ti5O12/Ag composite by an electroless deposition method ScienceDirect Oct. 21, 2006, pp. 3704-3708, vol. 52 Electrochimica Acta.
R. Dominko, M. Gaberscek, M. Bele, D. Mihailovic, and J. Jamnik Carbon nanocoatings on active materials for Li-ion batteries ScienceDirect Jun. 5, 2006, pp. 909-913, vol. 27 Journal of the European Ceramic Society.
A.D. Robertson, L. Trevino, H. Tukamoto, and J.T.S. Irvine New inorganic spinel oxides for use as negative electrode materials in future lithium-ion batteries Journal of Power Sources 1999, pp. 352-357, vol. 81-82 Elsevier Sequoia, The Netherlands.
Pier Paolo Prosini, Rita Mancini, Lorenzo Petrucci, Vittoria Contini, and Paola Villano Li4 Ti5 O12 as anode in all-solid-state, plastic, lithium-ion batteries for low-power applications Solid State Ionics Jun. 13, 2001, pp. 185-192, vol. 144 Elsevier Sequoia, The Netherlands.
J.L. Allen, T.R. Row, and J. Wolfenstine Low temperature performance of nanophase Li4Ti5O12 ScienceDirect Dec. 8, 2005, pp. 1340-1345, vol. 159 Journal of Power Sources.
F. Ronci, P. Reale. B. Scrosati, S. Panero, V. Rossi Albertini, P. Perfetti, M. di Michiel, and J.M. Merino High-Resolution In-Situ Structural Measurements of the Li4/3Ti5/3O4 "Zero-Strain" Insertion Material J. Phys. Chem. B, 2002, pp. 3082-3086, vol. 1069 American Chemical Society, USA.
A.D. Robertson, H. Tukamoto, & J.T.S. Irvine Based Spinels: Possible Negative Electrode Materials for Future Li-Ion Batteries Journal of the Electrochemical Society Feb. 17, 1999, pp. 3958-3962, vol. 146 (11) The Electrochemical Society, USA.
S. Scharner, W. Weppner, & P. Schmid-Beurmann Evidence of Two-Phase Formation Upon Lithium Insertion into the Li1.33 Ti1.67 O4 Spinel Journal of Electrochemical Society Oct. 8, 2008, pp. 857-861, vol. 146 (3) The Electrochemical Society, USA.
Zhimin Zhong Synthesis of Mo4+ Substituted Spinel Li4Ti5-xMoxO12 Electrochemical and Solid-State Letters Jun. 29, 2007, pp. A267-A269, vol. 10 (12) The Electrochemical Society, USA.
Tsutomu Ohzuku, Atushi Ueda, & Norihiro Yamaoto Zero-Strain Insertion Material of Li[Lil/3Tis/3]O4 for Rechargeable Lithium Cells Journal of the Electrochemical Society May 1995, pp. 1431-1435, vol. 142, No. 5 The Electrochemical Society, USA.
K. Zaghib, M. Armand, & M. Gauthier Electrochemistry of Anodes in Solid-State Li-Ion Polymer Batteries Journal of the Electrochemical Society Sep. 1998, pp. 3135-3140, vol. 145, No. 9 The Electrochemical Society, USA.
W. Lu, I. Belharouak, & K. Amine Electrochemical and Thermal Investigation of Li4/3Ti5/3O4 Spinel Journal of the Electrochemical Society Jul. 26, 2006, pp. A114-A118, vol. 154 (2) The Electrochemical Society, USA.
E. Ferg, R. J. Gummow, & A. de Kock Spinel Anodes for Lithium-Ion Batteries Journal of the Electrochemical Society Nov. 1994, pp. L147-L150, vol. 141, No. 11 The Electrochemical Society, USA.
C. H. Chen, J. T. Vaughey, A. N. Jansen, D. W. Dees, A. J. Kahaian, T. Goacher, & M. M. Thackeray Studies of Mg-Substituted Li42xMgxTi5O12 Spinel Electrodes (0 # x # 1) for Lithium Batteries Journal of the Electrochemical Society May 10, 2000, pp. A102-A104, vol. 148 (1) The Electrochemical Society, USA.

(Continued)

*Primary Examiner* — Barbara Gilliam
*Assistant Examiner* — Gary Harris
(74) *Attorney, Agent, or Firm* — Patentbar International, P.C.

(57) ABSTRACT

Field of use: the electrotechnical industry, in particular, anode materials for lithium-ion ECCs. Essence of the invention: Anode material based on lithium-titanium spinel that contains doping components, chromium and vanadium, in equivalent quantities, of the chemical formula Li4Ti5-2y(CryVy)O12-x, where x is the deviation from stoichiometry within the limits $0.02 < x < 0.5$, and y is the stoichiometric coefficient within the limits $0 < y < 0.1$.

1 Claim, No Drawings

OTHER PUBLICATIONS

Liang Cheng, Xi-Li Li, Hai-Jing Liu, Huan-Ming Xiong, Ping-Wei Zhang, & Yong-Yao Xia Carbon-Coated Li4Ti5O12 as a High Rate Electrode Material for Li-Ion Intercalation Journal of the Electrochemical Society Jan. 11, 2007, pp. A692-A697, vol. 154 (7) The Electrochemical Society, USA.

Martin Wilkening, Roger Amade, Wojciech, & Paul Heitjans Ultraslow Li diffusion in spinel-type structured Li4Ti5O12—A comparison of results from solid state NMR and impedance spectroscopy Physical Chemistry Chemical Physics Jan. 18, 2007, pp. 1239-1246, vol. 9.

K. M. Colbow, J.R. Dahn, & R. R. Haering Structure and Electrochemistry of the Spinel Oxides LiTi,04 and Li4, 3Ti5,304 Journal of Power Sources 1989, pp. 397-402, vol. 26 Elsevier Sequoia, The Netherlands.

Shahua Huang, Zhaoyin Wen, Zhonghua Gu, & Xiujian Zhu Preparation and cycling performance of Al3+and F—co-substituted compounds Li4AlxTi5—xFyO12—y ScienceDirect: Electrochimica Acta Feb. 17, 2005, pp. 4057-4062, vol. 50 Journal of Power Sources, USA.

Haiying Yu, Haiming Xie, A.F. Jalbout, Xuedong Yan, Xiumei Pan, & Rongshun Wang High-rate characteristics of novel anode Li4Ti5O12/polyacene materials for Li-ion secondary batteries Electrochimica Acta Dec. 20, 2007, pp. 1-21.

Juan Li, Yong-Li Jin, Xiao-Gang Zhang, & Hui Yang Microwave solid-state synthesis of spinel Li4Ti5O12 nanocrystallites as anode material for lithium-ion batteries ScienceDirect: Solid State Ionics Oct. 19, 2007. pp. 1590-1594 Journal of Power Sources, USA.

I. A. Leonidov, O. N. Leonidova, R. F. Samigullina, & M.V. Patrakeev Structural Aspects of Lithium Transfer in Solid Electrolytes Li2xZn2—3xTi1+xO4 (0.33 •• x •• 0.67) Journal of Structural Chemistry, pp. 262-268, vol. 45, No. 2, 2004 Springer Science + Business Media, Inc.

Shahua Huang, Zhaoyin Wen, Jingchao Zhang, Zhonghua Gu, & Xiaohe Xu Li4Ti5O12/Ag composite as electrode materials for lithium-ion battery ScienceDirect: Solid State Ionics Jan. 29, 2006, pp. 851-855, vol. 177 Journal of Power Sources, USA.

Pierre Kubiak, Aurelie Garcia, Manfred Womes, Laurent Aldon, Josette Olivier-Fourcade, Pierre-Emmanuel Lippens, & Jean-Claude Jumas Phase transition in the spinel Li4Ti5O12 induced by lithium insertion Influence of the substitutions Ti/V, Ti/Mn, Ti/Fe ScienceDirect: Solid State Ionics 2003, pp. 626-630.

Mark Q. Synder et al. Synthesis and characterization of atomic layer deposited titanium nitride thin films on lithium titanate spinel powder as a lithium-ion battery anode ScienceDirect: Journal of Power Sources; Nov. 10, 2006, pp. 379-385, vol. 165 Journal of Power Sources, USA.

Jinwei Xu, Yunfei Wang, Zonghui Li, and W.F. Zhang Preparation and electrochemical properties of carbon-doped TiO2 nanotubes as an anode material for lithium-ion batteries ScienceDirect; Journal of Power Sources; Oct. 6, 2007, pp. 903-908, vol. 175 Elsevier Sequoia, The Netherlands.

* cited by examiner

ANODE MATERIAL FOR LITHIUM-ION CHEMICAL POWER SOURCES AND METHOD OF OBTAINING THEREOF

RELATED APPLICATIONS

This application claims priority to Russian Patent Application No. RU2009107944 filed on Mar. 6, 2009, which is incorporated herein by reference in its entirety.

FIELD OF THE INVENTION

The invention relates to electrotechnical industry, in particular, to anode materials for ECCs (electrochemical cells), and can be used as the starting material for lithium-ion secondary batteries (storage batteries) designed for applications requiring large capacitance and high operating currents, for example, electric transport—HEV (hybrid electric vehicles), PHEV (plug-in hybrid electric vehicles), BEV (battery electric vehicles), or portable electric power tools.

BACKGROUND OF THE INVENTION

The most widely used couple in lithium-ion storage batteries is the $LiCoO_2/C$ (carbon) couple. However, the compound $LiC_6$ that is formed when lithium ions are inserted into a carbon structure, for example, graphite, is explosion hazardous. The drawbacks of graphite include alteration of the structure during operation and an initial loss of capacitance up to 20%. These drawbacks lead to the necessity of using other materials as the anode, for example, lithium-titanium spinel, $Li_4Ti_5O_{12}$ (in alternate notation, $Li_{4/3}Ti_{5/3}O_4$).

[J. Li, Y-L. Jin, X.-G. Zhang, H. Yang. Microwave solid-state synthesis of spinel $Li_4Ti_5O_{12}$ nanocrystallites as anode material for lithium-ion batteries//Solid State Ionics.—2007,—V. 178.—P. 1590-1594.; Xu J., Wang Y., Li Z., Zhang W. F. Preparation and electrochemical properties of carbon-doped $TiO_2$ nanotubes as an anode material for lithium-ion batteries//Journal of Power Sources.—2008,—V. 175.—P. 903-908; $Li_4Ti_5O_{12}$ as anode in all-solid-state, plastic, lithium-ion batteries for low-power applications//P. P. Prosini, R. Mancini, L. Petrucci et al.//Solid State Ionics.—2001, V.—144.—P. 185-192.]

Anode materials for lithium-ion electrochemical cells, lithium-titanium spinels, in particular $Li_4Ti_5O_{12}$, began to be regarded as promising material for lithium batteries since the mid-1980s.

[D. W. Murphy, R. J. Cava, S. Zahurak, A. Santoro. Ternary $Li_xTiO_2$ phases from insertion reactions//Solid State Ionics.—1983.—V. 9-10.—P. 413-417; K. M. Colbow, J. R. Dahn and R. R. Haering. Structure and Electrochemistry of Spinel Oxides $LiTi_2O_4$ and $Li_{4/3}Ti_{5/3}O_4$//J. of Power Sources.—1989.—V. 26,—N. 3/4.—P. 397-402; T. Ohzuku, A. Ueda, N. Yamamoto. Zero-Strain Insertion Material of $Li[Li_{1/3}Ti_{5/3}]O_4$ for Rechargeable Lithium Cells//J. Electrochem. Soc.—1995.—V. 142.—I. 5.—P. 1431-1435].

One formula unit of this substance is capable of accepting three lithium ions. The electrochemical discharge process is described by the following reaction:

$$Li_4Ti_5O_{12} + 3e^- + 3Li^+ = Li_7Ti_5O_{12}$$

The theoretical specific capacitance of the substance in the process described by the equation is 175 mA-h/g. As a result of this reaction, the initial structure of the substance of the spinel type shifts to a metastable phase with an ordered structure of the NaCl type. As distinct from the majority of the known electrode materials for lithium-ion ECCs, the electromotive force of which depends on the degree of discharge of the material (expressed as the subscript x of lithium in the formula of the active substance, for example, $Li_xCoO_2$), in this case it is determined by the twophase equilibrium, $(Li_4Ti_5O_{12})^{spinel}/(Li_7Ti_5O^{12})^{quasi-NaCl}$, and therefore is constant and is $E°=1.55$ V in relation to metallic lithium.

The crystallographic notation of this concentration transition for the tripled formula unit of the classical spinel $(3×AB_2O_4 = A_3B_6O_{12}$, where A and B are atoms at the tetrahedral and octahedral sites of the structure, respectively) has the following appearance:

$$Li^A{}_3(LiTi_5)^BO_{12} + 3Li \rightarrow Li_6(LiTi_5)O_{12} = B'_6B_6O_{12}$$

This formula expresses the formation of two non-equivalent sublattices with octahedral sites of the 16c and 16d type. Since the initial tetrahedral sites in the process described become octahedral through filling with additional lithium atoms (8a→16c), this concentration phase transition is possible only if all tetrahedral sites in the initial spinel structure are occupied by mobile lithium. If an atom not capable of transition to 16c octahedral sites in the course of the process under discussion is present at 8a tetrahedral sites, the process is "frozen," and a reversible charge-discharge electrochemical reaction, as occurs, for example, in the case of doping of a lithium-titanium spinel with iron, is impossible.

[P. Kubiak, A. Garcia, M. Womes, L. Aldon, J. Olivier-Fourcade, P.-E. Lippens, J.-C. Jumas. Phase transition in the spinel $Li_4Ti_5O_{12}$ induced by lithium insertion. Influence of the substitutions Ti/V, Ti/Mn, Ti/Fe. //J. Power Sources.—2003.—V. 119-121.—P. 626-630].

As the electromotive force of the potential-generating reaction in relation to metallic lithium, $E°_{Li}$, is equal to 1.55 V, thus with the use of this substance as an anode, the electromotive force of the cell is substantially lower than with the use of the traditional carbon electrode ($C_6$—$LiC_6$; $E°_{Li} \approx 0.1$ V), and resulting specific energy of the material is not large, but this drawback is redeemed by the unique cycleability of the material. Since the volume changes are negligible, 0.07%, in the case of the $Li_4Ti_5O_{12} \rightarrow Li_7Ti_5O_{12}$ transition, this is regarded as a highly favorable factor fostering cycle life, as the mechanical degradation of the macrostructure of the electrode is excluded. The low cost of the initial raw material, compounds of titanium, is also of considerable significance for marketing prospects of the material. In addition, the charged form of the material, $Li_7Ti_5O_{12}$, is entirely safe, unlike $LiC_6$, and all the more so, metallic lithium, which are spontaneously inflammable in air (for example, when the electric cell is destroyed).

[E. Ferg, R. J. Gummow, A. de Kock, M. M. Thackeray. Spinel Anodes for Lithium-Ion Batteries//J. Electrochem. Soc.—1994.—V. 141.—I. 11.—P. L147-L150; K. Zaghib, M. Armand, M. Gauthier. Electrochemistry of Anodes in Solid-State Li-Ion Polymer Batteries//J. Electrochem. Soc.—1998.—M. 145.—I. 9.—P. 3135-3140; A. D. Robertson, L. Trevino, H. Tukamoto, J. T. S. Irvine. New inorganic spinel oxides for use as negative electrode materials in future lithium-ion batteries//J. of Power Sources.—1999.—V. 81-82.—P. 352-357; see also RF patent No. 2304325, published Aug. 10, 2007].

The aggregate of these properties makes it possible to regard the lithium-titanium spinel as a highly promising anode material for lithium electric cells. However, the low electron conduction of the material and, as a result, the low degree of operating capacitance extraction (not more than 160 mA-h/g, e.g., not more than 90% of the theoretical), especially at high current densities, is the main impediment to the use of this material in the mass production of electric cells.

The reason for the low electron conduction is the absence of charge carriers in the structure of this substance, making it virtually a dielectric. The titanium in this structure has the highest oxidation state, 4+, and the charge balance can be expressed by the formula $Li^+_4Ti^{4+}_5O^{2-}_{12}$. Since the titanium 4+ ion has a $3d^0$ electronic configuration, the valence band is completely filled and the conduction band is completely empty. The electron conduction, therefore, as for other dielectrics, is determined by the "prehistory" of the specimen, in the first place by the presence and concentration of impurities that produce donor and acceptor levels, as well as by its intrinsic imperfection. According to the data of many published sources, the electron conduction of $Li_4Ti_5O_{12}$ under normal conditions lies in the interval, $10^{-8}$-$10^{-13}$ $ohm^{-1}$·$cm^{-1}$.

[C. H. Chen, J. T. Vaughey, A. N. Jansen, D. W. Dees, A. J. Kahaian, T. Goacher, M. M. Thackeray. Studies of Mg-Substituted $Li_{4-x}Mg_xTi_5O_{12}$ Spinel Electrodes (0<x<1) for Lithium Batteries//J. Electrochem. Soc.,—2001,—V. 148,—P. A102.; I. A. Leonidov, O. N. Leonidova, O. F. Samigullina, M. V. Patrakeev. Structural Aspects of Lithium Transfer in Solid Electrolytes Li2xZn2-3xTi1+xO4 ($0.33 \leq x \leq 0.67$)//Zhurnal strukturnoy khimii [Journal of Structural Chemistry].—2004.—V. 45.—No. 2.—P. 262-268; M. Wilkening, R. Amade, W. Iwaniak, P. Heitjans. Ultraslow Li diffusion in spinel-type structured $Li_4Ti_5O_{12}$—A comparison of results from solid state NMR and impedance spectroscopy//Phys. Chem. Chem. Phys.—2007—V. 9—P. 1239-1246; see also U.S. Pat. No. 7,211,350, date of issue May 1, 2007; U.S. Pat. No. 6,379,843, date of issue Apr. 30, 2002 (Europatent EP 0 845 825 B1, issued Jan. 21, 2004); US applications US20070238023, published Oct. 11, 2007; US 20070243467, published Oct. 18, 2007;].

Several methods are known for increasing the electron conduction of a lithium-titanium spinel. The creation of a twophase composition comprising an electrochemically active substance, in this case $Li_4Ti_5O_{12}$, and an electroconductive additive that is uniformly distributed among the lithium titanate particles, is possible. Both mechanical mixtures of the electrode material and various forms of carbon, as well as chemically deposited films of carbon on lithium titanate, are used. The development of this logic has led to the creation of a material with a carbon electroconductive coating on $Li_4Ti_5O_{12}$ particles.

[L. Cheng, X. Li, H. Liu, H. Xiong, P. Zhang, Y. Xia. Carbon-Coated $Li_4Ti_5O_{12}$ as a High Rate Electrode Material for Li-Ion Intercalation//J. Electrochem. Soc.—2007.—V. 154.—I. 7.—P. A692-A697; R. Dominko, M. Gaberscek, M. Bele, D. Mihailovic, J. Jamnik. Carbon nanocoatings on active materials for Li-ion batteries.//J. of the Eur. Cer. Soc.—2007.—V. 27.—I. 2-3.—P. 909-913; US application US2008/0315161, published Dec. 25, 2008]

Metals, in particular copper and silver, as well as an intermetallide, titanium nitride (TiN), have also been proposed as such electroconductive additives. The current characteristics of the anode material are improved by means of the creation of disperse two-phase compositions, obtained in particular by in situ methods. The use of compositions with electroconductive polymers has also been proposed.

[S. Huang, Z. Wen, J. Zhang, X. Yang. Improving the electrochemical performance of $Li_4Ti_5O_{12}$/Ag composite by an electroless deposition method//Electrochimica Acta.—2007.—V. 52.—I. 11.—P. 3704-3708; S. Huang, Z. Wen, B. Lin, J. Han, X. Xu. The high-rate performance of the Newly Designed $Li_4Ti_5O_{12}$/Cu composite anode for lithium ion batteries//Journal of Alloys and Compounds.—2008.—V. 457,—I. 1-2.—P. 400-403; S. Huang, Z. Wen, J. Zhang, Z. Gu, Xi. $Li_4Ti_5O_{12}$/Ag composite as electrode materials for lithium-ion battery//Solid State Ionics.—2006. V. 177.—I. 9-10.—P. 851-855; M. Q. Snyder, S. A. Trebukhova, B. Ravdel, M. C. Wheeler, J. DiCarlo, C. P. Tripp, W. J. DeSisto. Synthesis and characterization of atomic layer deposited titanium nitride thin films on lithium titanate spinel powder as a lithium-ion battery anode//Journal of Power Sources—2007—V. 165.—P. 379-385; H. Yu, H. Xie, A. F. Jalbout, X. Yan, X. Pan, R. Wang, High-rate characteristics of novel anode $Li_4Ti_5O_{12}$/polyacene materials for Li-ion secondary batteries//Electrochimica Acta.—2007.—V. 53.—I. 12,—P. 4200-4204.]

While increasing the total electroconductivity of the composition, these methods do little to improve the local conditions of discharge of the particles of the electrode material beyond the limits of the direct electrode material-electroconductive additive contact. In addition, conductive surface additives operate only at the initial stage of the electrochemical intercalation of lithium into the material. It should be taken into consideration that the $Li_7Ti_5O_{12}$ phase obtained from the initial material upon its discharge is a very good conductor, since it contains a high concentration of $Ti^{3+}$ ($3d^1$), i.e., electrons in the conduction band (in accordance with the formula $Li_7Ti^{3+}_3Ti^{4+}_2O_{12}$). Therefore, the $Li_4Ti_5O_{12}$ particles (starting from the composition $Li_{4+\delta}Ti_5O_{12}$, where $\delta \approx 0.1$, i.e.~$\frac{1}{30}$ of the total capacitance) are already coated with a current-conducting layer of $Li_7Ti_5O_{12}$ at the initial stages of the process, which makes the presence of a preliminarily created layer superfluous. Subsequently the process takes place along the interphase boundary between $Li_4Ti_5O_1$ and $Li_7Ti_5O_{12}$, i.e., the lithium ions and electrons enter the reaction zone through the $Li_7Ti_5O_{12}$ layer. The reverse process (discharge) must proceed in an entirely different manner, since a nonconductive layer of $Li_4Ti_5O_{12}$ is formed in its turn at the surface of the $Li_7Ti_5O_{12}$ particles (at least at high rates of discharge) and the lithium ions and electrons now enter the reaction zone through the $Li_4Ti_5O_{12}$ layer. In this case the presence of an electroconductive layer at the surface of the particles is not crucial for some significant improvement of the kinetics of the electrode process.

[S. Scharner, W. Wepner, P. Schmid-Beurmann. Evidence of Two-Phase Formation upon Lithium insertion into the $Li_{1.33}Ti_{1.67}O_4$ Spinel//J. Electrochem. Soc.—1999.—V.

146.—I. 5.—P. 857-861; W. Lu, I. Belharouak, J. Liu, K. Amine. Electrochemical and Thermal Investigation of $Li_{4/3}Ti_{5/3}O_4$ Spinel//J. of the Electrochemical Society,—2007.—V. 154.—P. A114-A118; F. Ronci, P. Reale, B. Scrosati, S. Panero, V. R. Albertini, P. Perfetti, M. di Michiel, J. M. Merino. High-Resolution In-Situ Structural Measurements of the $Li_{4/3}Ti_{5/3}O_4$ "Zero-Strain" Insertion Material.//J. Phys. Chem. B,—2002.—V. 106,—P. 3082].

A second approach to improving electron conduction is the introduction of impurities, or doping, i.e., the partial substitution of structure-forming ions by other ions, as a rule, in a different charge state. In the process the concentration of the doping element is such that the type of crystalline structure of the initial substance is unchanged. Impurity charge defects serving as carriers of electric current are formed in the substance as a result of such substitution. In case of the absence or extremely low concentration of its intrinsic current carriers, the occurrence of such extrinsic carriers may alter the conductivity of the substance by many orders of magnitude.

In the known methods of producing anode materials, substantial substitution of titanium by molybdenum with simultaneous reduction of molybdenum to the $Mo^{4+}$ state results in improvement of the conductivity of the final product. Thus, the measured electrical conductivities for $Li_4Ti_{4.5}Mo_{0.5}O_{12}$, $Li_4Ti_4MoO_{12}$, and $Li_4Ti_{3.5}Mo_{1.5}O_{12}$ are 1.6, 2.8, and $5.8 \cdot 10^{-3}$ $ohm^{-1} \cdot cm^{-1}$, respectively. However, molybdenum is not a "good" doping element for the mass production of lithium-titanium spinel, as the cost of its reagents is high.

[Z. Zhong. Synthesis of $Mo^{4+}$ Substituted Spinel $Li_4Ti_{5-x}Mo_xO_{12}$//Electrochemical and Solid-State Letters,—2007,—V. 10—N. 12—P. A267-A269; US application US2009/0004563, published Jan. 1, 2009].

In other known methods, the substitution of titanium in $Li_4Ti_5O_{12}$ by iron, nickel, vanadium, and manganese results in the appearance of these elements both at the octahedral and the tetrahedral sites of the structure. This depresses the concentration phase transition and degrades the electrochemical properties of the material. The results of electrochemical studies of these substituted compositions leads to the same conclusions. Attempts have been made at the substitution of titanium by other elements as well, for example, Al, Ga, and Co, or at substitution in an anion sublattice.

[S. Scharner, W. Wepner, P. Schmid-Beurmann. Evidence of Two-Phase Formation upon Lithium insertion into the $Li_{1.33}Ti_{1.67}O_4$ Spinel//J. Electrochem. Soc.—1999.—V. 146.—I. 5.—P. 857-861; A. D. Robertson, L. Trevino, H. Tukamoto, J. T. S. Irvine. New inorganic spinel oxides for use as negative electrode materials in future lithium-ion batteries//J. of Power Sources.—1999.—V. 81-82.—P. 352-357; A. D. Roberston [sic], H. Tukamoto, J. T. S. Irvine.//J. Electrochem. Soc. 146 (1999) P. 3958; P. Kubiak, A. Garcia, M. Womes, L. Aldon, J. Olivier-Fourcade, P.-E. Lippens, J.-C. Jumas. Phase transition in the spinel $Li_4Ti_5O_{12}$ induced by lithium insertion. Influence of the substitutions Ti/V, Ti/Mn, Ti/Fe.//J. Power Sources.—2003.—V. 119-121.—P. 626-630; S. Huang, Z. Wen, X. Zhu, Z. Lin. Effects of dopant on the electrochemical performance of $Li_4Ti_5O_{12}$ as electrode material for lithium ion batteries.//J. of Power Sources.—2007.—V. 165.—I. 1.—P. 408-412; S. Huang, Z. Wen, Z. Gu, X. Zhu. Preparation and cycling performance of $Al^{3+}$ and $F^-$ co-substituted compounds $Li_4Al_xTi_{5-x}F_yO_{12-y}$. //Electrochimica Acta—2005.—V. 50.—I. 20.—P. 4057-4062].

A new approach was demonstrated in a method according to which, by means of heat treatment of samples of lithium titanate at high temperatures in a reducing gaseous environment, materials of the composition, $Li_4Ti_5O_{12-\delta}$, where $\delta \leq 0.012$, that are reduced in the anion sublattice, are obtained. Such nonstoichiometry with respect to oxygen leads to a sharp increase in electronic conductivity, approximately to $10^{-6} - 3 \cdot 10^{-6}$ S/cm under normal conditions (temperature 298° K) due to the partial removal of oxygen with preservation of the crystalline structure. However, exceeding the limiting value $\delta = 0.012$ leads to loss of stability of the crystalline structure and decay of the spinel phase to compounds with structures of the $Li_2Ti_3O_7$ and $\gamma$-$Li_2TiO_3$ types.

[V. Gorchkov, O. Volkov. Lithium titanate and method of forming the same. U.S. Pat. No. 7,541,016, issued Jun. 2, 2009].

The traditional approach of intensification of the electrode process in active materials of ECCs—the production of an electrode with a high specific surface area and small effective particle size (for example, by the sol-gel or dry-spray [dry spraying] methods), does not lead to improvement of the discharge characteristics, since the resulting increase in the surface of the electrolyte and electrode contact does not decrease ohmic resistance, and the extremely low electronic conductivity of the electrode is a limiting factor. Decreasing the size of the particles leads to deterioration of cycleability at high discharge rates, especially at low temperatures.

[J. L. Allen, T. R. Jow, J. Wolfenstine. Low temperature performance of nanophase $Li_4Ti_5O_{12}$. J. of Power Sources.—2006.—V. 159.—I. 2. P. 1340-1345; U.S. Pat. No. 7,368,097, date of issue May 6, 2008; U.S. Pat. No. 6,881,393, date of issue Apr. 19, 2005].

All known anode materials based on lithium-titanium spinel for ECCs produced by the methods described above possess inadequate electronic conductivity, and as a consequence thereof, limited electrochemical capacitance and cycleability at high operating currents that impede use in devices with high wattage consumption. At the same time, the cost of the initial components is high and the production methods are complicated.

There is a known anode material for lithium-ion ECCs based on lithium-titanium spinel of the chemical formula, $Li_4Ti_5O_{12-x}$, where x is the deviation from stoichiometry with respect to oxygen, within the limits of $0 < x < 0.02$, that is closest to the invention being applied for in technical essence and result to be achieved.

The known method—the prototype of the production of said anode material for lithium-ion ECCs, includes preparation of a mixture of the initial components, that contain lithium and titanium, by means of homogenization and pulverization, with subsequent heat treatment of the prepared mixture in a controlled atmosphere of inert and reducing gases. Wherewith hydrogen, hydrocarbons, and carbon monoxide are used as reducing gases and the reduction process (heat treatment) is run at a temperature of 450° C. for 30 minutes.

[see US application No. US 2007/0238023, IPC H01M 4/48, C01G 23/04, published Oct. 11, 2007; patent issued to V. Gorshkov, O. Volkov. Lithium titanate and method of forming the same. U.S. Pat. No. 7,541,016 B2. Jun. 2, 2009].

The characteristics of the known anode material for lithium-ion ECCs produced by method described above are given in the Table.

Although the known material possesses high electrochemical capacitance, and good cycleability, it does not operate at high discharge currents due to low electronic conductivity.

SUMMARY OF THE INVENTION

The objective of the present invention is to produce anode material for lithium-ion ECCs that possesses high electronic conductivity and electrochemical capacitance for use in devices with operating at high discharge currents.

The stated objective is achieved by the fact that the known anode material for lithium-ion ECCs based on lithium-titanium spinel of the chemical formula, $Li_4Ti_5O_{12-x}$,
where x is the deviation from stoichiometry within the limits 0<x<0.02,
ACCORDING TO THE INVENTION, contains doping components, chromium and vanadium, in equivalent quantities to achieve a composition of the formula, $Li_4Ti_{5-2y}(Cr_yV_y)O_{12-x}$,
where 0.02<x<0.5, and y is the stoichiometric coefficient within the limits 0<y<0.25.

In the known method of production of anode material for lithium-ion ECCs, which includes preparation of a mixture of the initial components, that contain lithium and titanium, by means of homogenization and pulverization, with subsequent heat treatment of the prepared mixture in controlled atmosphere of inert and reducing gases,
ACCORDING TO THE INVENTION, sources of doping elements, chromium and vanadium, are introduced into the mixture of initial components, the pulverization is carried out until particles no greater than 0.5 mcm in size are obtained, and the heat treatment is carried out stepwise in an atmosphere of argon and acetylene, regulating the volume ratio of the gases in the argon-acetylene stream from 999:1 to 750:250, respectively, according to the following procedure:
- at the first stage the mixture of components is heated to a temperature no higher than 350° C.;
- at the second stage the heating is continued in the 350-750° C. temperature interval at a rate no greater than 10° C./min, which provides for solid-phase interaction of the components;
- at the third stage the temperature is increased to 840-850° C. and the product obtained is held at this temperature no less than 1 hour;
- at the fourth stage the temperature is decreased to 520-580° C. at a rate no greater than 5° C./min, and the anode material obtained is held at this temperature no less than 2 hours;
- at the final stage the finished anode material is blown through with pure argon during cooling to 40-60° C. and packaged.

The substantial distinctions of the method being applied for comprise the following:
- the introduction of doping components chromium and vanadium into the mixture of the initial components results in the heterovalent substitution of titanium, with the occurrence of additional free electrons at the d-levels, ensuring the high electronic conductivity of the anode material;
- the type of doping elements and their concentrations are selected in such a way that these elements appear only at the octahedral positions of the crystal structure, which provides for cycleability of the material in the electrochemical process;
- the pulverization of the initial components until particles no greater than 0.5μ in size are obtained and homogenization of the mixture promote augmentation of the rate of the basic process:

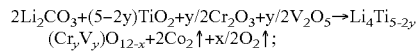

$$2Li_2CO_3+(5-2y)TiO_2+y/2Cr_2O_3+y/2V_2O_5 \rightarrow Li_4Ti_{5-2y}(Cr_yV_y)O_{12-x}+2CO_2\uparrow+x/2O_2\uparrow;$$

- regulating the volume ratio of the gases in the argon-acetylene stream from 999:1 to 750:250, respectively, ensures reduction for obtaining the specified parameter x within the limits from 0 to 0.5 in the finished product;
- the temperature, rate, and time regimes of the stepwise heat treatment promotes the running of the basic reaction in the solid phase without melting, without substantial increase in the size of the particles of the material, without the formation of impurity compounds and low-reacting titanium oxide in the form of rutile, and with achievement of the composition of the finished product applied for;
- the final heat treatment stage with pure argon blow-through prevents the oxidation of the finished anode material during cooling, while also protecting it against absorption of moisture from the atmosphere.

The substantial distinctions of the proposed method are necessary and sufficient for the production of anode material for lithium-ion ECCs of the formula being applied for with high electrochemical characteristics:

| | |
|---|---|
| Electronic conductivity | $2 \cdot 10^{-2}$ ohm$^{-1} \cdot$ cm$^{-1}$ |
| Electrochemical capacitance | 165 ± 5 mA · hour/g |
| Electrochemical potential | 1.53 ± 0.01 V |

The above and other features of the invention including various novel details of construction and combinations of parts, and other advantages, will now be more particularly described and pointed out in the claims. It will be understood that the particular method and device embodying the invention are shown by way of illustration and not as a limitation of the invention. The principles and features of this invention may be employed in various and numerous embodiments without departing from the scope of the invention.

DETAILED DESCRIPTION OF THE PREFERRED EMBODIMENTS

The best embodiment was selected from a large-scale series of trials (more than 100) of production of anode material for lithium-ion ECCs carried out in laboratory conditions of an electrochemical enterprise of the Ural region.

The following commercial chemical reagents were used for the production of the anode material:
Li2CO3—lithium carbonate;
TiO2—titanium oxide (IV), in the form of anatase;
Cr2O3—chromium oxide (III);
$V_2O_5$—vanadium oxide (IV);
LiOH—lithium hydroxide;
$Li_2O$—lithium oxide;
LiNO$_3$—lithium nitrate;
TiO$_2$ in the form of rutile;
TiO$_2 \cdot$xH$_2$O—titanium hydroxide;
(NH$_4$)$_2$CrO$_3$—ammonium chromate;
NH$_4$VO$_3$—ammonium metavanadate;
Li$_2$CrO$_3$—lithium chromate;

$Li_4VO_3$—lithium metavanadate.

Example. Production of anode material for lithium-ion ECCs.

For preparation of a mixture of the initial components for the production of anode material for lithium-ion ECCs based on lithium-titanium spinel, $TiO_2$ (technical grade, anatase, TU [Technical Specifications] 1715-347-00545484-94) and $Li_2CO_3$ (TU [Technical Specifications] 95.1951-89, LU-1 [lithium carbonate-1] grade) were selected; sources of doping components $Cr_2O_3$ (GOST [State Standard] 2912-79, OKhP-1 [chromium oxide pigment-1] grade), $V_2O_5$ (TU [Technical Specifications] 6-09-4093-88, qualification ChDA [analytically pure]) were introduced; wherewith the weighed portions of the initial components for the production of 100 g of finished product with the formula $Li_4Ti_{4.95}(CrV)_{0.025}O_{11.9}$ were, in g:

| | |
|---|---|
| $TiO_2$ | 86.38163 |
| $Li_2CO_3$ | 32.28549 |
| $Cr_2O_3$ | 0.41506 |
| $V_2O_5$ | 0.49668 |
| $Li_4Ti_{4.95}(CrV)_{0.025}O_{11.9}$ | 100 g |

It should be noted that the gaseous reaction products were, respectively, in g:

| | |
|---|---|
| $CO_2$ | 19.22932 |
| $O_2$ | 0.34953 |

The initial components were homogenized (agitated) and placed in a ball mill for pulverization to particles no greater than 0.5μ in size. The degree of homogeneity of the mixture was characterized by the fact that a random sample of the mixture of reagents weighing no more than 0.1 g contained an excess of no more than 0.1% of any of the components.

The prepared mixture of the components was then placed in a tube furnace with a controlled gaseous atmosphere, creating a volume ratio of the gases in the argon-acetylene stream of 750:250, respectively. The heat treatment was carried out stepwise, according to the following procedure:

at the first stage the mixture of components was heated to a temperature of 350° C.;

at the second stage the heating was continued in the 350-750° C. temperature interval at a rate of 10° C./min, which provides for solid-phase interaction (reduction) of the components in the main reaction;

at the third stage the temperature was increased to 850° C. and the product obtained were held at this temperature for 1 hour;

at the fourth stage the temperature was decreased to 550° C. at a rate of 4° C./min, and the anode material obtained was held at this temperature for 2 hours;

at the final stage the finished anode material was blown through with pure argon during cooling to a temperature below 50° C. and was packaged in containers in an argon atmosphere to prevent oxidation and absorption of moisture from the atmosphere.

The characteristics of the finished anode material for lithium-ion ECCs are given in the Table; these were determined by means of the following standard analysis methods:

crystalline structure and phase composition: powder x-ray diffraction density: gas pycnometry;

chemical composition: ISP (inductively coupled plasma spectroscopy), titrimetric methods;

application characteristics: galvanostatic cycling of test cells, impedance measurements on pressed samples with applied silver electrodes.

Industrial Applicability

The anode material for lithium-ion ECCs applied for, that possesses high electrochemical capacitance (165±5 mA·hour/g) and electronic conductivity (2.10-2 $ohm^{-1} \cdot cm^{-1}$), is intended for use in devices operating at high discharge currents, for example, electric transport storage batteries or portable electric power tools. This material can be produced from accessible components on traditional equipment of domestic facilities; this attests to the conformity of the invention to the "industrial applicability" criterion.

While this invention has been particularly shown and described with references to preferred embodiments thereof, it will be understood by those skilled in the art that various changes in form and details may be made therein without departing from the scope of the invention encompassed by the appended claims.

The Characteristics of Anode Materials for Lithium-Ion ECCs

TABLE

| | | Anode Material for ECCs | |
|---|---|---|---|
| No./item | Name, Unit of Measurement | prototype | applied for |
| 1 | Chemical formula | $Li_4Ti_5O_{12-x}$ | $Li_4Ti_{5-2y}(Cr_y,V_y)O_{12-x}$ |
| 2 | Name | lithium-titanium (4:5) oxide | |
| 3 | Color | blue | black, blue-black |
| 4 | Form | powder | powder |
| 5 | Density, g/cm³ | 3.53 ± 0.03 | 3.57 ± 0.02 |
| 6 | Decomposition temperature in the solid phase, ° C. | 925 | 925 |
| 7 | Melting point, ° C. | 1295-1300 | 1295-1300 |
| 8 | Crystalline structure | cubic, spinel type | cubic, spinel type |
| 9 | Space group | Fd3̄m (No. 227) | Fd3̄m (No. 227) |
| 10 | Crystal lattice parameter, Å | 8.358 | 8.368 ± 0.003 |
| 11 | Electronic conductivity $\sigma_{el}^{295}$, $ohm^{-1} cm^{-1}$ | $\sim 10^{-5}$-$10^{-6}$ | $5 \cdot 10^{-3}$ |
| 12 | Electrochemical capacitance, mA · hour/g | 155-160 | 165 ± 5 |
| 13 | Electrochemical potential in relation to lithium, V | 1.55 | 1.52 |

What is claimed is:

1. An anode material for electrochemical cells based on lithium-titanium spinel of a chemical formula, $Li_4Ti_5O_{12-x}$, where x is a deviation from stoichiometry within the limits $0<x<0.02$, comprising doping components chromium and vanadium in equivalent quantities to achieve a composition of a formula $Li_4Ti_{5-2y}(Cr_yV_y)O_{12-x}$, where $0.02<x<0.5$, and y is a stoichiometric coefficient within the limits $0<y<0.25$.

* * * * *